United States Patent
Kuroda et al.

(10) Patent No.: US 7,280,983 B2
(45) Date of Patent: Oct. 9, 2007

(54) INFORMATION RECORDING MEDIUM HAVING REPRODUCTION CONTROL PROGRAM RECORDED THEREON AND REPRODUCTION CONTROL PROGRAM

(75) Inventors: Kazuo Kuroda, Tokorozawa (JP); Yoshiaki Moriyama, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 557 days.

(21) Appl. No.: 10/650,996

(22) Filed: Aug. 29, 2003

(65) Prior Publication Data
US 2004/0054862 A1    Mar. 18, 2004

(30) Foreign Application Priority Data
Sep. 2, 2002    (JP)    ............................ P2002-256449

(51) Int. Cl.
*G06F 17/60* (2006.01)
(52) U.S. Cl. ............................ 705/57; 705/51; 705/52; 705/58; 380/201; 707/9; 713/182; 713/183
(58) Field of Classification Search .................... 705/1, 705/57, 51, 52, 58; 380/201; 707/9; 713/182, 713/183
See application file for complete search history.

(56) References Cited

U.S. PATENT DOCUMENTS

| | | | | |
|---|---|---|---|---|
| 5,629,980 A | * | 5/1997 | Stefik et al. ................... | 705/54 |
| 5,691,972 A | | 11/1997 | Tsuga et al. ............. | 369/275.3 |
| 5,933,498 A | * | 8/1999 | Schneck et al. ............... | 705/54 |
| 6,006,332 A | * | 12/1999 | Rabne et al. ................... | 726/6 |
| 6,141,483 A | | 10/2000 | Yamada et al. ................ | 386/46 |
| 6,289,455 B1 | * | 9/2001 | Kocher et al. .............. | 713/194 |

FOREIGN PATENT DOCUMENTS

JP    1041767    * 10/2000

OTHER PUBLICATIONS

Digital Rights Management for Visual Content in Mobile Application, Mejdi Trimeche, date unknown.*

* cited by examiner

*Primary Examiner*—Andrew J. Fischer
*Assistant Examiner*—John Winter
(74) *Attorney, Agent, or Firm*—Drinker Biddle & Reath LLP

(57) ABSTRACT

Even when a movie or the like is distributed in an electronic state, reproduction control can be effectively performed for each region at a distribution destination, thereby providing a reproduction control program capable of widely distributing distributed information in an effective manner.

The reproduction control program acquires distribution information which is distributed along with region information indicating a reproduction permitting region, and the reproduction control program is installed to a terminal T to operate the terminal T for reproducing the acquired distribution information. The region information indicating the reproduction permitting region based on the reproduction control program is stored in the terminal T, and it is confirmed whether or not a coincidence is made between a region indicated by the stored region information and a region indicated by stream region information included in the acquired distribution information. The distribution information is reproduced only when the region indicated by the region information and the region indicated by the stream region information are coincident with each other.

3 Claims, 10 Drawing Sheets

BLOCK DIAGRAM SCHEMATICALLY SHOWING CONFIGURATION OF INFORMATION TRANSMISSION SYSTEM ACCORDING TO EMBODIMENT

BLOCK DIAGRAM SCHEMATICALLY SHOWING CONFIGURATION OF INFORMATION TRANSMISSION SYSTEM ACCORDING TO EMBODIMENT

DIAGRAM SHOWING PATTERN OF DISTRIBUTION INFORMATION TRANSMITTED IN INFORMATION TRANSMISSION SYSTEM ACCORDING TO PRESENT EMBODIMENT

FIG. 3A

SPECIFIC CONTENTS OF INFORMATION TABLE ACCORDING TO PRESENT EMBODIMENT

| NUMBER | CONTENTS | BYTES |
|---|---|---|
| 1 | HD: HEADER INFORMATION | 1 |
| 2 | CCI1: FIRST COPY CONTROL INFORMATION | 1 |
| 3 | CCI2: SECOND COPY CONTROL INFORMATION | 1 |
| 4 | PA: REPRODUCIBLE REGION INFORMATION | 1 |
| 5 | RAA: RECORDABLE REGION INFORMATION | 1 |
| 6 | TA: TIME-SHIFTING REGION INFORMATION | 1 |
| 7 | PT: VIEWABLE PERIOD INFORMATION | 16 |
| 8 | RT: RECORDABLE PERIOD INFORMATION | 16 |
| 9 | TT: TIME-SHIFTING PERIOD INFORMATION | 1 |
| 10 | ECC: ERROR CORRECTION INFORMATION | 17 |

| NUMBER | CONTENTS | BYTES |
|---|---|---|
| 1 | HD: HEADER INFORMATION | 1 |
| 2 | RP: POST-RECORDING REPRODUCIBLE REGION INFORMATION | 1 |
| 3 | RR: POST-RECORDING RECORDABLE REGION INFORMATION | 1 |
| 4 | RT: POST-RECORDING TIME-SHIFTING REGION INFORMATION | 1 |
| 5 | R: AUXILIARY INFORMATION | 35 |
| 6 | ECC: ERROR CORRECTION INFORMATION | 17 |

TB2

CONFIGURATION OF REPRODUCTION CONTROL
PROGRAM ACCORDING TO PRESENT EMBODIMENT

BLOCK DIAGRAM SCHEMATICALLY SHOWING CONFIGURATION OF SERVER ACCORDING TO PRESENT EMBODIMENT

BLOCK DIAGRAM SCHEMATICALLY SHOWING TERMINAL ACCORDING TO PRESENT EMBODIMENT

FLOWCHART SHOWING OPERATION PERFORMED
WHEN POWER IS TURNED OFF

FLOWCHART SHOWING OPERATION PERFORMED
WHEN POWER IS TURNED ON

INFORMATION RECORDING MEDIUM HAVING REPRODUCTION CONTROL PROGRAM RECORDED THEREON AND REPRODUCTION CONTROL PROGRAM

BACKGROUND OF THE INVENTION

1. Field of the Invention

The present invention relates to the technical field of an information recording medium having a reproduction control program recorded thereon and reproduction control program. More specifically, the present invention relates to the technical field of an information recording medium, which has recorded thereon a reproduction control program for reproducing reproduction information including movies distributed via networks such as the Internet, and reproduction control program.

2. Description of the Related Art

In recent years, DVDs (Digital Versatile Disc) have been widely used which are several times larger in recording capacity than conventional CDs (Compact Disc). It is understood that the DVD can record, for example, moving images and sound of a single movie.

In general, the movies or the like recorded in the DVDs are copyrighted products and the products are usually protected by copyrights. In this case, the copyrights are specifically protected by, for example, limiting the number of copies of a movie to another recording medium from a DVD having recorded the movie or limiting regions permitting the reproduction of the DVD.

To be specific, in order to limit regions permitting the reproduction of the DVD, the DVD is caused to record region information indicating regions where the DVD is distributed (hereinafter, the region information recorded on the DVD will be referred to as disc region information), and a DVD player for playing the movie or the like from the distributed DVD also stores region information indicating regions where the DVD player is permitted to operate (hereinafter, the region information stored in the DVD player will be simply referred to as player region information). Only when a region indicated by the disc region information and a region indicated by the player region information are coincident with each other, the movie or the like can be reproduced by the DVD player.

On the other hand, research and development have been recently conducted in earnest to distribute movies or the like themselves in an electronic state via networks such as the Internet.

However, when movies or the like are distributed via the networks, particularly in the case of the Internet, it is technically difficult for a server serving as a distributor to specify the location of a computer serving as a terminal at a distribution destination. Therefore in this case, it is impossible to limit the distribution destination of the movies or the like to specific regions and thus it is not possible to effectively protect copyrights by limiting regions permitting reproduction, that is, it is not possible to effectively perform reproduction control for each region.

SUMMARY OF THE INVENTION

The present invention has been devised in view of the above problem. An object of the present invention is to provide a reproduction control program and an information recording medium having recorded the reproduction control program whereby reproduction control can be effectively performed for each region at a distribution destination and thus reproduction information can be widely distributed in an effective manner even when movies or the like are distributed in an electronic state.

The above object of the present invention can be achieved by a reproduction control program. The reproduction control program that causes a reproducing computer to function, the reproduction computer being included in an information reproducing apparatus that acquires a reproduction information including region information indicative of a region permitting reproduction of the acquired reproduction information and reproduces the acquired reproduction information, the reproducing computer being caused to function as: a storing device for storing permitting region information which is indicating the region where reproduction using the reproduction control program is permitted, an acquiring device for acquiring the reproduction information, a confirming device for confirming whether or not a coincidence is made between a region indicated by the stored permitting region information and a region indicated by the region information included in the acquired reproduction information, a reproducing device for reproducing the acquired reproduction information only when a coincidence is made between the region indicated by the stored permitting region information and the region indicated by the region information included in the acquired reproduction information, and a prohibiting device for prohibiting another reproduction control program corresponding to the permitting region information indicating a different region from being installed into the information reproducing apparatus having installed the reproduction control program.

According to the reproduction control program, the acquired reproduction information is reproduced only when the coincidence is made between the region indicated by the stored permitting region information and the region indicated by the region information included in the acquired reproduction information. Thus, the reproduction can be effectively prohibited in regions where the acquired reproduction is not permitted to be reproduced. Further, in the information reproducing apparatus having installed the reproduction control program, another reproduction control program corresponding to a different region is prohibited from being installed. Thus, one information reproducing apparatus functions only in one region and reproduction control can be effectively performed on the reproduction information for each of the regions.

In one aspect of the reproduction control program, the reproduction control program further comprising a partial reproduction control program for causing the reproducing computer to function as the storing device, wherein the partial reproduction control program is distributed to all regions via a network.

According to this aspect, since the partial reproduction control program including the program region information is distributed to all the regions, reproduction control can be effectively performed on the reproduction information for each of the regions receiving the reproduction control program.

In another aspect of the reproduction control program, wherein the reproduction information includes copy control information in advance, the copy control information controlling copy performed on the reproduction information after the information reproducing apparatus performs reproduction, and after the reproduction control program being installed to the information reproducing apparatus, the reproducing computer is caused to further function as a control device for controlling the copy performed on the reproduction information based on the copy control information.

According to this aspect, since the copy of the reproduction information is controlled based on the copy control information, it is possible to effectively control illicit copy on the reproduction information.

In further aspect of the reproduction control program, wherein the reproduction information includes period information in advance, the period information corresponding to the region information and indicating a period during which the reproduction information is permitted to be reproduced, and the reproduction control program causing the reproducing computer to further function as: an installed clocking device for starting clocking when the reproduction control program is installed to the information reproducing apparatus, a change prohibiting device for prohibiting a change in clocking time of the installed clocking device after the clocking is started, and a time permitting device for permitting the acquired reproduction information to be reproduced by the reproducing device only when the clocking time indicate a time within a period indicated by the period information.

According to this aspect, the clocking of the installed clocking device is started when the reproduction control program is installed, and the reproduction of the reproduction information is permitted only when only when the clocking time indicate a time within a period indicated by the period information, which is acquired along with the reproduction information. Thus, the reproduction information can be widely distributed in an efficient manner by controlling the reproduction of the reproduction information based on a time base.

In further aspect of the reproduction control program, wherein the reproducing computer is caused to further function as a changing device for changing clocking time of existing clocking device to clocking time of the installed clocking device, the existing clocking device being provided in advance in the information reproducing apparatus.

According to this aspect, the clocking time of existing clocking device is changed to the clocking time of the installed clocking device, thereby effectively performing reproduction control on the reproduction information based on a time base controlled by the reproduction control program.

In further aspect of the reproduction control program, wherein the information reproducing apparatus further comprises nonvolatile time storing device, the existing clocking device can continue clocking even when a power supply switch is turned off in the information reproducing apparatus, and the reproduction control program causes the reproducing computer to further function as: an off detecting device for detecting whether or not the power supply switch is turned off, a storage control device for storing in the time storing device the clocking time of the existing clocking device when the power supply switch is turned off and storing the clocking time of the installed clocking device at that timing, an on detecting device for detecting whether or not the power supply switch is turned on again, an off time detecting device for detecting time information indicating a time period during which the power supply switch is turned off, based on the clocking time held by the existing clocking device when the turning on is detected and the clocking time of the existing clocking device, the contents being stored in the time storing device, and a clocking correcting device for, at the detection of the turning on, continuing clocking of the installed clocking device after adding time indicated by the time information to the clocking time of the installed clocking device at the detection of the turning off.

According to this aspect, the clocking time are corrected as follows: the time of turn off the power supply switch is detected and the detected time is added to the clocking time of the installed clocking device at the time of cutting off the power supply switch. Thus, even when the power supply switch is turned off, reproduction control can be performed on the reproduction information while accurately maintaining the clocking time corresponding to the reproduction control program.

The above object of the present invention can be achieved by an information recording medium. The information recording medium records a reproduction control program. The reproduction control program that causes a reproducing computer to function, the reproduction computer being included in an information reproducing apparatus that acquires a reproduction information including region information indicative of a region permitting reproduction of the acquired reproduction information and reproduces the acquired reproduction information, the reproducing computer being caused to function as: a storing device for storing permitting region information included in the reproduction information permitting reproduction using the reproduction control program, an acquiring device for acquiring the reproduction information, a confirming device for confirming whether or not a coincidence is made between a region indicated by the stored permitting region information and a region indicated by the region information included in the acquired reproduction information, a reproducing device for reproducing the acquired reproduction information only when a coincidence is made between the region indicated by the stored permitting region information and the region indicated by the region information included in the acquired reproduction information, and a prohibiting device for prohibiting another reproduction control program corresponding to the permitting region information indicating a different region from being installed into the information reproducing apparatus having installed the reproduction control program.

According to the information recording medium, the reproducing computer reads out the reproduction control program from the information recording medium and it functions in such a manner that the acquired reproduction information is reproduced only when the coincidence is made between the region indicated by the stored permitting region information and the region indicated by the region information included in the acquired reproduction information. Thus, the reproduction can be effectively prohibited in regions where the acquired reproduction is not permitted to be reproduced. Further, in the information reproducing apparatus having installed the reproduction control program, another reproduction control program corresponding to a different region is prohibited from being installed. Thus, one information reproducing apparatus functions only in one region and reproduction control can be effectively performed on the reproduction information for each of the regions.

BRIEF DESCRIPTION OF THE DRAWINGS

FIG. 3A is a diagram (I) showing the specific contents;

FIG. 3B is a diagram (II) showing the specific contents;

FIG. 10B is a flowchart showing the handling when the power of the terminal is turned on.

DETAILED DESCRIPTION OF THE PREFERRED EMBODIMENTS

A preferred embodiment of the present invention will be described below in accordance with the accompanying drawings.

The following embodiment will describe the case where the present invention is applied to an information transmission system for performing distribution after reproduction control for each country or region is performed on distributed information such as movies which are distributed via broadcast radio waves or networks such as the Internet.

Figure 1:
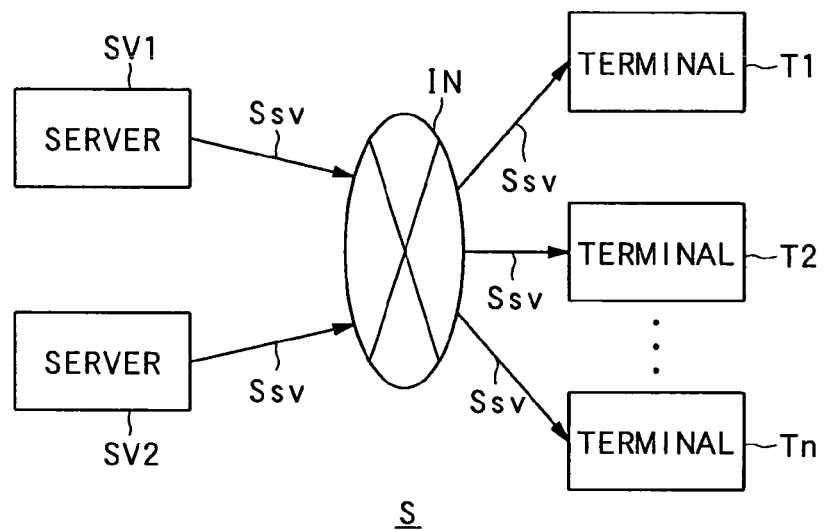
FIG. 1 is a block diagram schematically showing the configuration of an information transmission system according to an embodiment.

Referring to FIG. 1, the overall configuration of the information transmission system will be firstly discussed according to the present embodiment. FIG. 1 is a block diagram showing the overall configuration of the information transmission system.

As shown in FIG. 1, an information transmission system S is constituted of a network IN such as the Internet, servers SV1 and SV2 connected to the network IN, and terminals T1 to Tn connected to the network IN. In the following explanation, the servers SV1 and SV2 will be collectively called servers SV as necessary and the terminals T1 to Tn will be collectively called terminals T as necessary.

The operations will be schematically described below.

First, the servers SV1 and SV2 are each connected to the network IN and distribute distribution information Ssv such as movies to the network IN along with stream region information, which will be described later.

Then, the terminal T receives from the network IN the distribution information Ssv having been provided on the network IN and the terminal T displays the information on a display or the like, which will be described later.

In this case, the server SV1 is installed in, for example, the U.S. and the server SV2 is installed in, for example, one of European nations. Further, one terminal T can receive the distribution information Ssv from both of the servers SV1 and SV2. Moreover, in the servers SV1 and SV2, it is not possible to specify which one of the terminals T receives the distribution information Ssv having been distributed by the servers SV1 and SV2.

Further, in addition to transmission and reception of the distribution information Ssv, a reproduction control program is also transmitted (downloaded) to any one of the terminals T from the servers SV in the information transmission system S. The program is used for reproduction including the display of the distribution information Ssv on the display or the like in the terminal T. Then, when the reproduction control program is transmitted to the terminal T and is installed into the terminal T, the distribution information Ssv can be reproduced in the terminal T.

Figure 2:
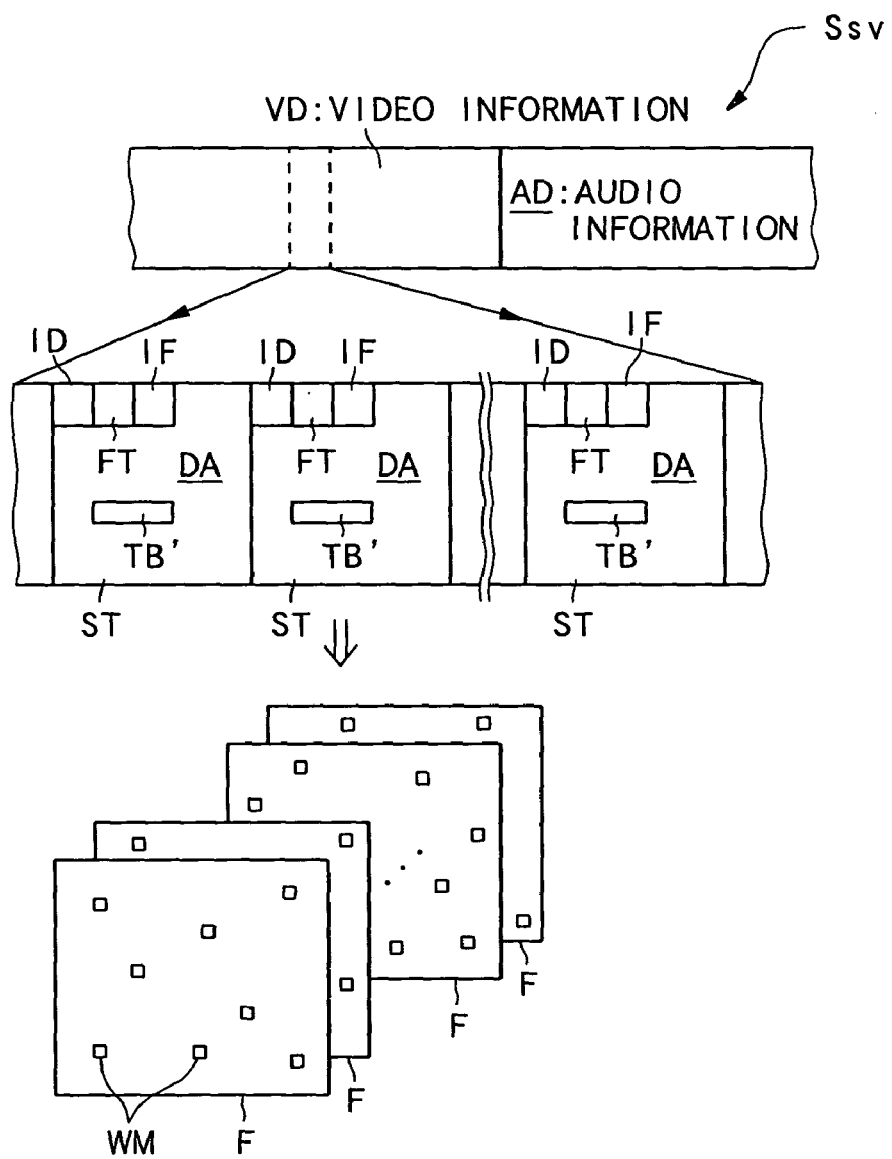
FIG. 2 is a diagram showing a pattern of distribution information transmitted in the information transmission system according to the present embodiment.

Referring to FIG. 2, the following will discuss a transmission pattern of the distribution information Ssv including the stream region information. FIG. 2 is a view showing the transmission pattern.

To be specific, as shown in FIG. 2, the distribution information Ssv outputted from the server SV includes one or more pieces of video information VD and audio information AD. The video information VD has moving images of two or more static images, and the audio information AD only includes voice information or sound information which corresponds to the video information VD. The video information VD is constituted of two or more pieces of sector information ST.

At this point, one piece of the sector information ST is constituted of, from the head, an identification information ID including a sector information number ST for identifying, in the video information VD, the sector information ST including the identification information ID, correction information FT including an error correction code for performing error correction when the identification information ID is detected, copy control information IF for controlling the number of copies when image information recorded in the sector information ST is duplicated after reproduction, and image information DA to be actually displayed along with the identification information ID and so on. As the copy control information IF, copy control information is stored which indicates whether or not recording information recorded as the image information DA can be freely duplicated and whether copy and recording are permitted only one time or completely prohibited, for each region obtained by dividing the world into eight as will be described later.

Further, the image information DA in the sector information ST includes an information table TB which describes region information or the like (hereinafter, region information distributed along with the distribution information Ssv will be referred to as stream region information). The region information indicates regions where reproduction is permitted for the distribution information Ssv distributed from the server SV via the network IN.

Subsequently, the static images included as the image information DA in the sector information ST, that is, a plurality of static images constituting moving image information serving as the image information DA will be described in detail. As shown in the lower part of FIG. 2, in frames F serving as the static images, the stream region information described as the information table TB is embedded as watermarks WM into eight places in bits (that is, eight bits in each of the frames F). At this point, the disc region information to be included in one of the information tables TB is embedded into the plurality of frames F. When the image information DA (i.e., distribution information Ssv) is reproduced, the contents of the information table TB embedded as the watermarks WM are detected and descrambled, so that reproduction control and so on is performed in accordance with the stream region information in the information table TB.

Referring to FIG. 3, the following will specifically describe the contents of the information table TB included in the sector information ST of the distribution information Ssv.

As shown in FIG. 3, the information table TB includes a first information table TB1 (56 bytes in total) and a second information table TB2 (56 bytes in total). In this case, each of the information tables TB has information of 56 bytes. As a result, each of the information tables TB is constituted of the watermarks WM which are included in the 112 (56×2) frames F of FIG. 2.

As shown in FIG. 3(A), the first information table TB1 includes, from the first byte, header information HD (1 byte) indicating that the subsequent information is included in the first information table TB1, first copy control information CCI1 (1 byte) which is copy control information about four regions of the eight divided regions of the world, second copy control information CCI2 (1 byte) which is copy control information about the other four regions of the eight regions, reproducible region information PA (1 byte) which serves as stream region information indicating countries or regions where reproduction is permitted after the distribution of the information Ssv, recordable region information RAA (1 byte) serving as stream region information indicating countries or regions where the distribution information Ssv having been distributed is permitted to be recorded on a recording medium such as a recordable DVD after distribution, time-shifting region information TA (1 byte) serving as stream region information indicating countries or regions where the distribution information Ssv having been distributed is permitted to be temporarily recorded and subjected to time shift reproduction after a time interval, viewable period information PT (16 bytes) indicating a time period during which the distribution information Ssv having been distributed is permitted to be reproduced and viewed at a distribution destination, recordable period information RT (16 bytes) indicating a time period during which the distribution information Ssv having been distributed is permitted to be recorded on another recording medium (to be specific, a recordable optical disk or the like) at a distribution destination, time-shifting period information TT (1 byte) indicating a time period during which the distribution information Ssv having been distributed is permitted to undergo time shift reproduction at a distribution destination, and error correction information ECC (17 bytes) used for error correction when the first information table TB1 is detected during the reproduction of the image information DA.

The contents of the copy control information CCI shown in FIG. 3(A) will be specifically described below. When copy is not restricted (in other words, copy and recording are permitted) in a region to which the distribution information Ssv corresponds, the copy control information CCI corresponding to the region is "00b ("b" indicates a binary number, also in the following description)". When the distribution information Ssv is permitted to be duplicated and recorded only once in the region, the copy control information CCI corresponding to the region is "10b". When the distribution information Ssv is not permitted to be duplicated or recorded at all, the copy control information CCI corresponding to the region is "11b". A value "01b" of the copy control information CCI corresponding to each region is an auxiliary value and is not used at normal times.

Further, for each of the eight regions, information of 1 bit is allocated to the reproducible region information PA included in the first information table TB1. The allocated information indicates whether or not the distribution information Ssv having been distributed is permitted to be reproduced in each of the regions.

To be specific, when the distribution information Ssv is reproducible in one region, the reproducible region information PA corresponding to the region has a value of "1b". When the distribution information Ssv is not reproducible in the region, the reproducible information corresponding to the region has a value of "0b".

Subsequently, the recordable region information RAA included in the first information table TB1 indicates, for each of the eight regions, whether or not the distribution information Ssv having been distributed is permitted to be reproduced and recorded on another recording medium in each of the regions.

To be specific, for each of the above regions; block diagram schematically showing the configuration of an information transmission system according to an embodiment when the distribution information Ssv having been distributed is permitted to be recorded on another recording medium in one region, the recordable region information RAA corresponding to the region has a value of "1b". When the distribution information Ssv is not recordable in the region, the reproducible information corresponding to the region has a value of "0b".

Further, the time-shifting region information RAA included in the first information table TB1 indicates, for each of the eight regions, whether or not the distribution information Ssv having been distributed is permitted to undergo time shift reproduction in each of the regions.

To be specific, for each of the above regions when the distribution information Ssv having been distributed is permitted to undergo time shift reproduction in one region, the time-shifting region information TA corresponding to the region has a value of "1b". When the distribution information Ssv is not permitted to undergo time shift reproduction in the region, the time-shifting region information corresponding to the region has a value of "0b".

Besides, the viewable period information PT included in the first information table TB1 indicates, for each of the eight regions, whether or not the distribution information Ssv having been distributed is permitted to be reproduced and viewed in each of the regions.

Further, the recordable period information RT included in the first information table TB1 indicates, for each of the eight regions, whether or not the distribution information Ssv having been distributed is permitted to be recorded on another recording medium in each of the regions.

The configurations of the viewable period information PT and the recordable period information RT for each of the regions will be described in detail.

As the viewable period information PT corresponding to each of the regions, an information amount of 2 bytes describes a time period during which distributed recording information is permitted to be reproduced and viewed in each of the corresponding regions. To be specific, an information amount of 5 bits from the head describes years up to 2032 (that is, $2000+2^5$ years) as a starting year of the viewable period for each of the regions, the subsequent information amount of 4 bits describes a starting month of the viewable period, the subsequent information amount of 5 bits describes the length of the viewable period, and the remaining information amount of 1 bit describes whether or not the viewable period is limited.

Further, this description format is used similarly in the viewable period information PIT in each of the other regions and the recordable period information RT in each of the regions.

Finally, the time-shifting period information TT included in the first information table TB1 describes a time period during which the distribution information Ssv to be distributed is permitted to undergo time shift reproduction, that is, a time period during which recording information received by the terminal T can undergo time shift reproduction while an upper limit value is set at 168 hours (1 week).

On the other hand, as shown in FIG. 3(B), the second information table TB2 includes, from the first byte, header information HD (1 byte) indicating that the subsequent information is included in the second information table TB2, post-recording reproducible region information RP (1 byte) which serves as stream region information indicating, regarding the eight regions, regions where another reproduction is permitted after the distribution information Ssv received in the terminal T is recorded on another recording medium such as an optical disc, post-recording recordable region information RR (1 byte) which serves as stream region information indicating, regarding the eight regions, regions where copy and recording on still another recording medium are permitted after the distribution information Ssv received in the terminal T is recorded on another recording medium such as an optical disc, post-recording time-shifting region information RT (1 byte) which serves as stream region information indicating, regarding the eight regions, regions where reproduction is permitted when a predetermined time elapses after the distribution information Ssv received in the terminal T is recorded on another recording medium such as an optical disc (time shift reproduction), auxiliary information R (35 bytes) including no significant information, and error correction information ECC (17 bytes) used for correcting an error when the second information table TB2 is detected during the reproduction of the image information DA.

At this point, for each of the eight regions, information of 1 bit is allocated to the post-recording reproducible region information RP included in the second information table TB2. The allocated information indicates whether or not reproduction is permitted in each of the regions after the distributed information Ssv having been distributed is reproduced and is recorded on another recording medium.

To be specific, block diagram schematically showing the configuration of an information transmission system according to an embodiment when reproduction is permitted in one region after the distribution information Ssv is reproduced and is recorded on another recording medium, the post-recording reproducible information corresponding to the region has a value of "1b". When reproduction is not permitted in the region after the distribution information Ssv is reproduced and is recorded on another recording medium, the post-recording reproducible information corresponding to the region has a value of "0b".

Further, for each of the eight regions, information of 1 bit is allocated to the post-recording recordable region information RR included in the second information table TB2. The allocated information indicates whether or not copy and recording on still another recording medium are permitted in each of the regions after the distributed information Ssv having been distributed is reproduced and is recorded on another recording medium.

To be specific, block diagram schematically showing the configuration of an information transmission system according to an embodiment after the distribution information Ssv is reproduced and is recorded on another recording medium, when copy and recording on still another recording medium are permitted in one region, the post-recording recordable information corresponding to the region has a value of "1b". When copy and recording are not permitted in the region, the post-recording recordable information corresponding to the region has a value of "0b".

Finally, for each of the eight regions, information of 1 bit is allocated to the post-recording time-shifting region information RT included in the second information table TB2. The allocated information indicates regions where time shift reproduction is permitted after the distribution information Ssv is recorded on another recording medium.

To be specific, block diagram schematically showing the configuration of an information transmission system according to an embodiment after the distribution information Ssv is recorded on another recording medium, when time shift reproduction is permitted in one region, the post-recording time-shifting region information RT corresponding to the region has a value of "1b". When time shift reproduction is not permitted in the region, the post-recording time-shifting region information RT corresponding to the region has a value of "0b".

Figure 4:
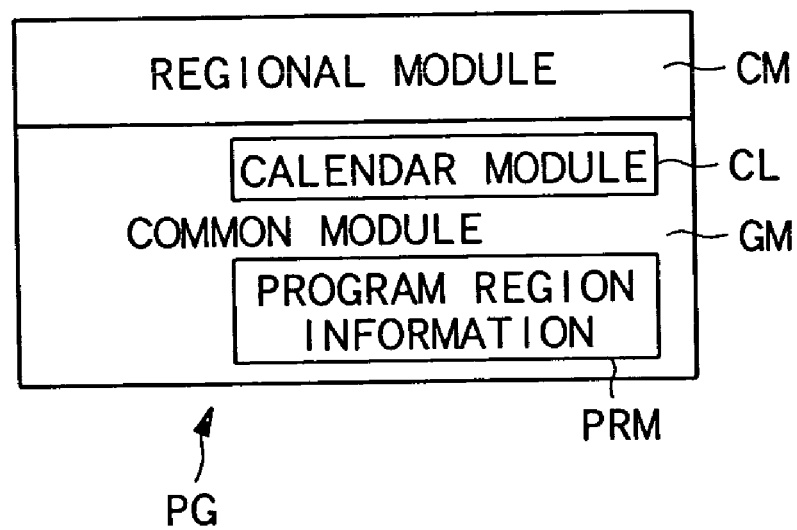
FIG. 4 is a diagram showing the configuration of a reproduction control program according to the program.

Referring to FIG. 4, the following will describe the form of the reproduction control program transmitted from the server SV to the terminal T in the information transmission system S. FIG. 4 is a view showing the data structure of the reproduction control program.

As shown in FIG. 4, a reproduction control program PG which is transmitted and received in the information transmission system S is constituted of a common module GM and a regional module CM.

In this case, the common module GM is transmitted to all the countries or regions where the transmission of the reproduction control program PG has been permitted in advance, and the common module GM functions as the reproduction control program PG regardless of languages.

Further, the regional module CM is different in each country and region where the transmission of the reproduction control program PG has been permitted in advance, and the module CM is transmitted only to the corresponding country or region and functions as the reproduction control program only in the country or region.

Besides, region information is embedded in the common module GM. The region information indicates countries or regions where the terminal T permitted to install the reproduction control program PG should be installed to function (namely, region information indicates countries or regions to which the reproduction control program PG should be formally transmitted, and the region information will be referred to as program region information PRM below).

In addition, the common module GM includes a calendar module CL providing the terminal T with a reproduction-only calendar function. The function starts clocking when the reproduction control program PG is installed to the terminal T, continues the clocking all the time when the power supply switch of the terminal T is turned on, and prevents the user of the terminal T from changing the clocking time.

The reproduction-only calendar operated on the terminal T by the calendar module CL is a register calendar. The register calendar performs clocking all the time on one of the servers SV for transmitting to the terminal T the distribution information Ssv to be reproduced, and continues clocking in synchronization with the register calendar serving as a reference of clocking performed by the reproduction-only calendar in the reproduction control program PG distributed from the server SV. Program Region Information PRM show the particular region. Common module are sent to each region as a different information with Program Region Information PRM and calendar module.

The following will describe the detailed configuration and operations of the server SV and the terminal T that transmit and receive the distribution information Ssv thus via the network IN.

Figure 5:
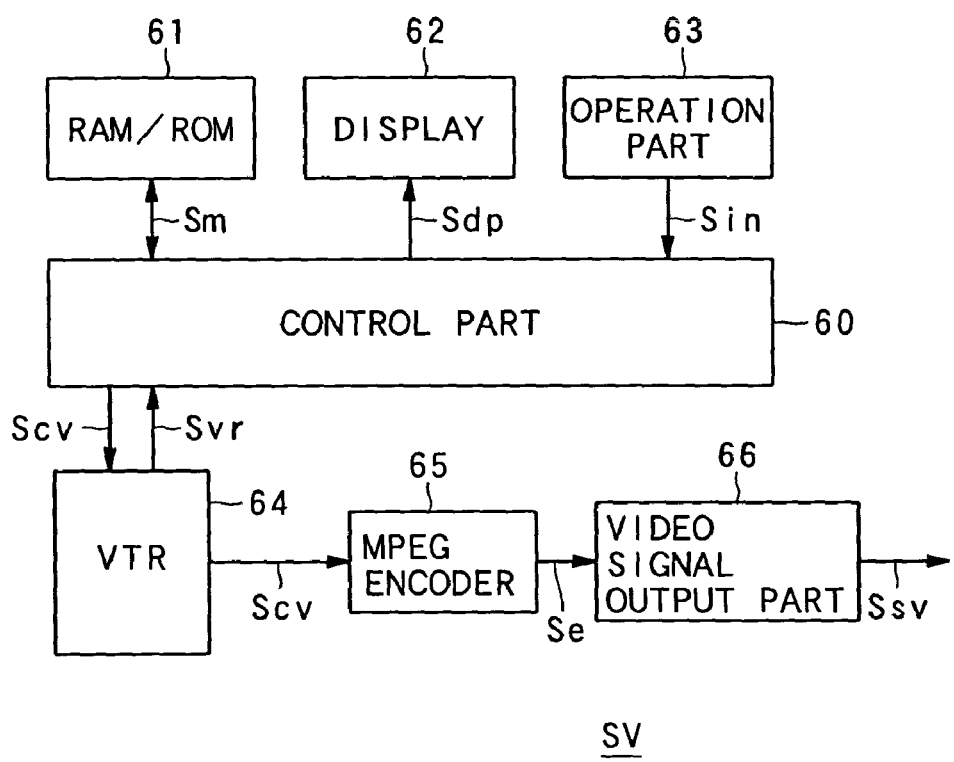
FIG. 5 is a block diagram schematically showing the configuration of a server according to the present embodiment.

Referring to FIG. 5, the detailed configuration and operation of the server SV will be described below. FIG. 5 is a block diagram showing the detailed configuration of the server SV.

As shown in FIG. 5, the server SV included in the information transmission system S is constituted of a control part 60, a memory 61 composed of a RAM (Random Access Memory) and a ROM (Read Only Memory), a display 62, an operating part 63, a VTR (Video Tape Recorder) 64, an MPEG (Moving Picture Experts Group) encoder 65, and a video signal output part 66.

The operation of the server SV will be described below.

First, information such as movies to be transmitted in the information transmission system S of the present embodiment is recorded in the VTR 64 in advance.

In response to the recording, based on an operation signal Sin corresponding to operation achieved in an operating part 63, movies or the like to be transmitted in the information transmission system S are extracted as distribution information Svr from information recorded in the VTR 64 while the control part 60 transmits and receives necessary information as a memory signal Sm to and from the memory 61. Then, the information tables TB to be transmitted while being superimposed on the extracted distributed information Svr (that is, the information tables TB which are distributed as the distribution information Ssv having the contents determined in advance by contracts or the like for each of the regions) are additionally generated, the generated information tables TB are embedded as watermarks in the distribution information Svr extracted from the VTR 64, and distribution information Scv having the embedded information tables TB is stored in the VTR 64 again. Thereafter, the VTR 64 is controlled so that the distribution information Scv having the embedded information tables TB is outputted to the MPEG encoder 65 at the predetermined timing.

Subsequently, the MPEG decoder 65 performs compression and modulation on the distribution information Scv in compliance with the MPEG system and outputs the information as modulation information Se to the video signal output part 66.

Then, the video signal output part 66 performs predetermined outputting operations including format conversion, encryption, and output interface processing on the modulating signal Se, and outputs the signal as the distribution information Ssv to the network IN.

Figure 6:
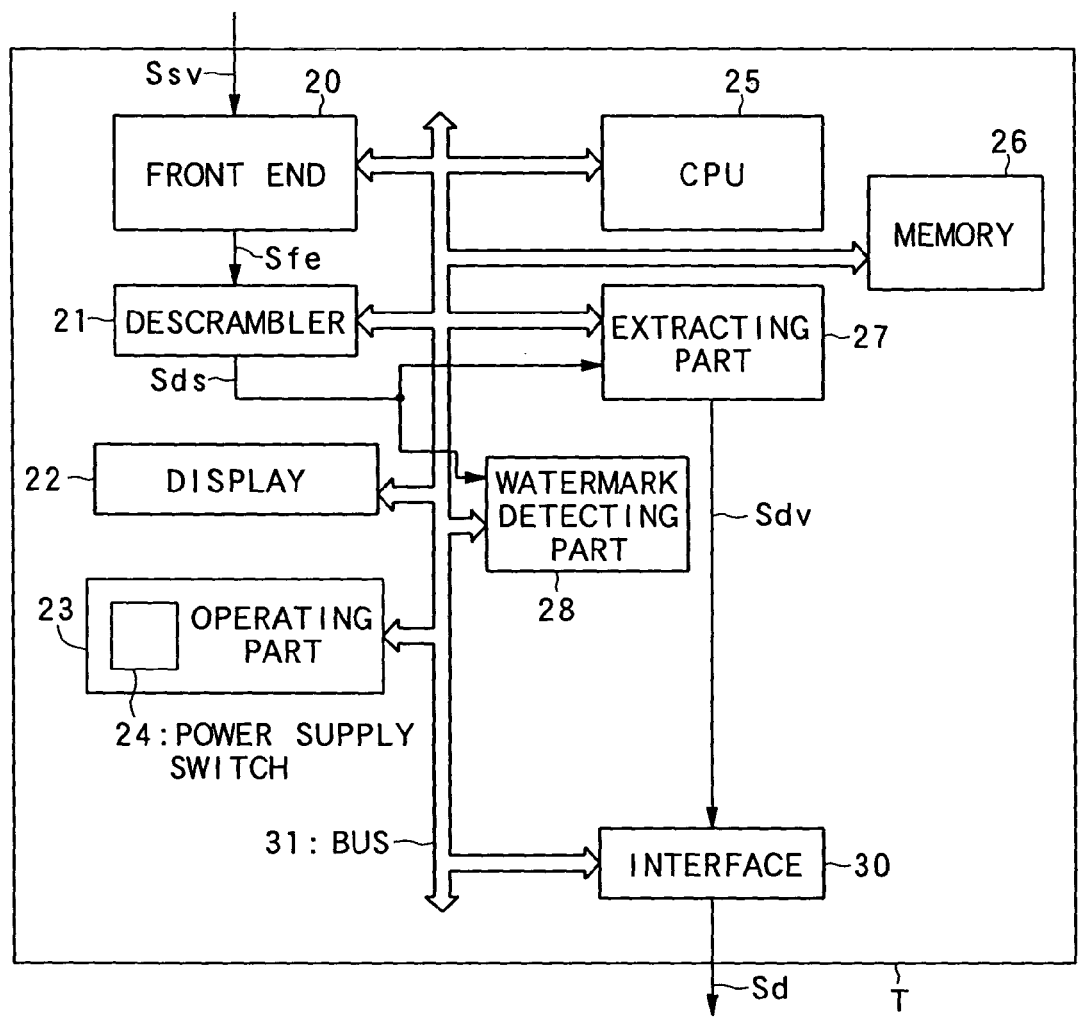
FIG. 6 is a block diagram schematically showing a terminal according to the present embodiment.

Referring to FIG. 6, the following will describe the detailed configuration and operations of the terminal T. FIG. 6 is a block diagram showing the detailed configuration of the terminal T.

As shown in FIG. 6, the terminal T which receives the distribution information Ssv via the network IN and outputs the information to the display of an external television set and so on (not shown) is constituted of a front end 20, a descrambler 21, a display 22, an operating part 23 including a power supply switch 24, a CPU 25 serving as a reproducing computer, a memory 26, an extracting part 27, a watermark detecting part 28, and an interface 30. The components can transmit and receive control information or the like to and from one another via a bus 31. Besides, the CPU 25 comprises a system calendar function which serves as time information for regulating the operations of the components constituting the terminal T. In this case, a system calendar provided by the system calendar function can keep clocking with an auxiliary power supply or the like even when the power supply switch of the terminal T is turned off.

The operation of the terminal T will be described below.

First, regarding the distribution information Ssv, image information and corresponding voice information are each compressed in compliance with the MPEG system, and the information is inputted after being encrypted.

Then, the front end 20 performs a predetermined receiving operation on the distribution information Ssv, generates a processed receiving signal Sfe, and outputs the signal to the descrambler 21.

Subsequently, the descrambler 21 descrambles the encryption of recording information included in the processed receiving signal Sfe, generates a descramble signal Sds, and outputs the signal Sds to the extracting part 27 and the watermark detecting part 28.

Thus, the extracting part 27 extracts from the descramble signal Sds only movies or the like to be outputted to the display, generates an extracted signal Sdv, and outputs the signal Sdv to the interface 30.

In parallel with the above operation, the watermark detecting part 28 extracts the information table TB which is superimposed on the distribution information Ssv included in the descramble signal Sds, and the watermark detecting part 28 outputs the information table TB to the CPU 25 via the bus 31.

Thus, the interface 30 performs predetermined interface processing on the extracted signal Sdv and outputs the signal Sdv as an output signal Sd to the display (not shown).

Figure 8:
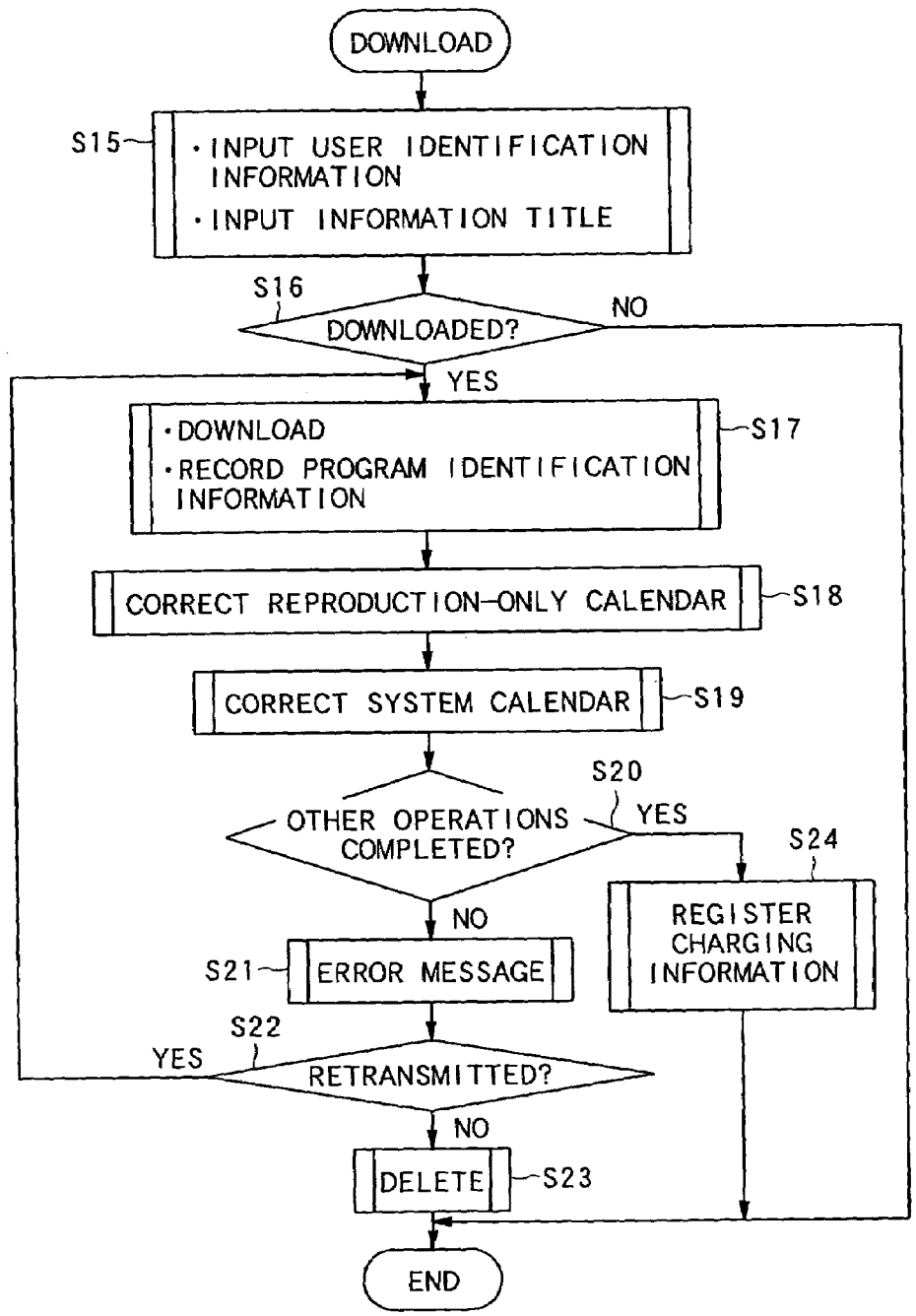
FIG. 8 is a flowchart showing the transmitting operation of the present embodiment.

At this point, based on the contents of the information table TB detected in the watermark detecting part 28 and the contents of operations performed by the user in the operation part 23, the CPU exercises control over the components while necessary control information is transmitted and received via the bus 31 so that the distribution information Ssv is outputted as shown in FIG. 8, which will be discussed later. Further, necessary information is used for the control while being temporarily stored in the memory 26 via the bus 31.

Moreover, the information required for the control is displayed on the display 22.

Referring to FIGS. 7 to 10, the following will describe operations performed in the information transmission system S configured thus according to the present embodiment.

Figure 7:
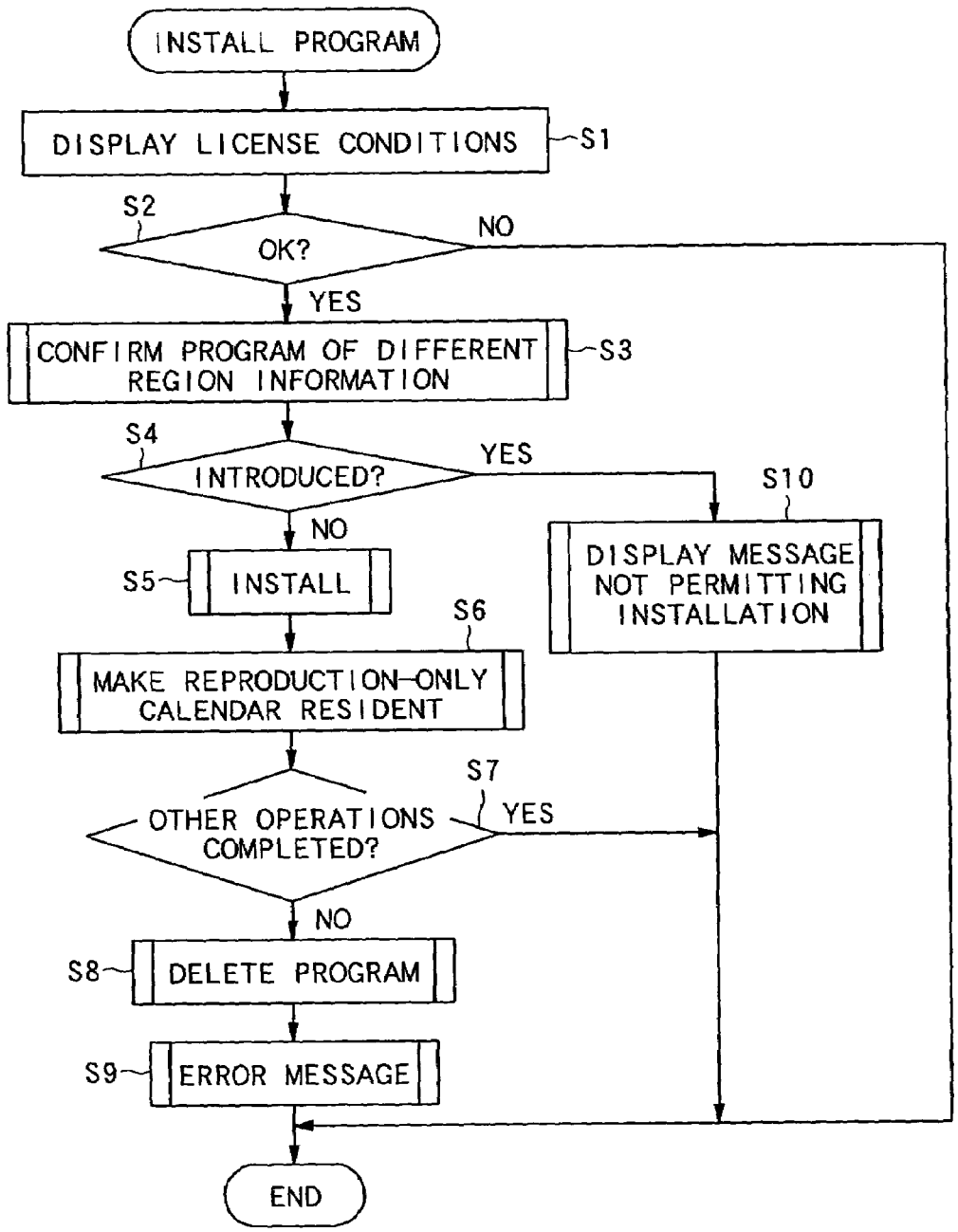
FIG. 7 is a flowchart showing the introducing operation of the present embodiment.
Figure 9:
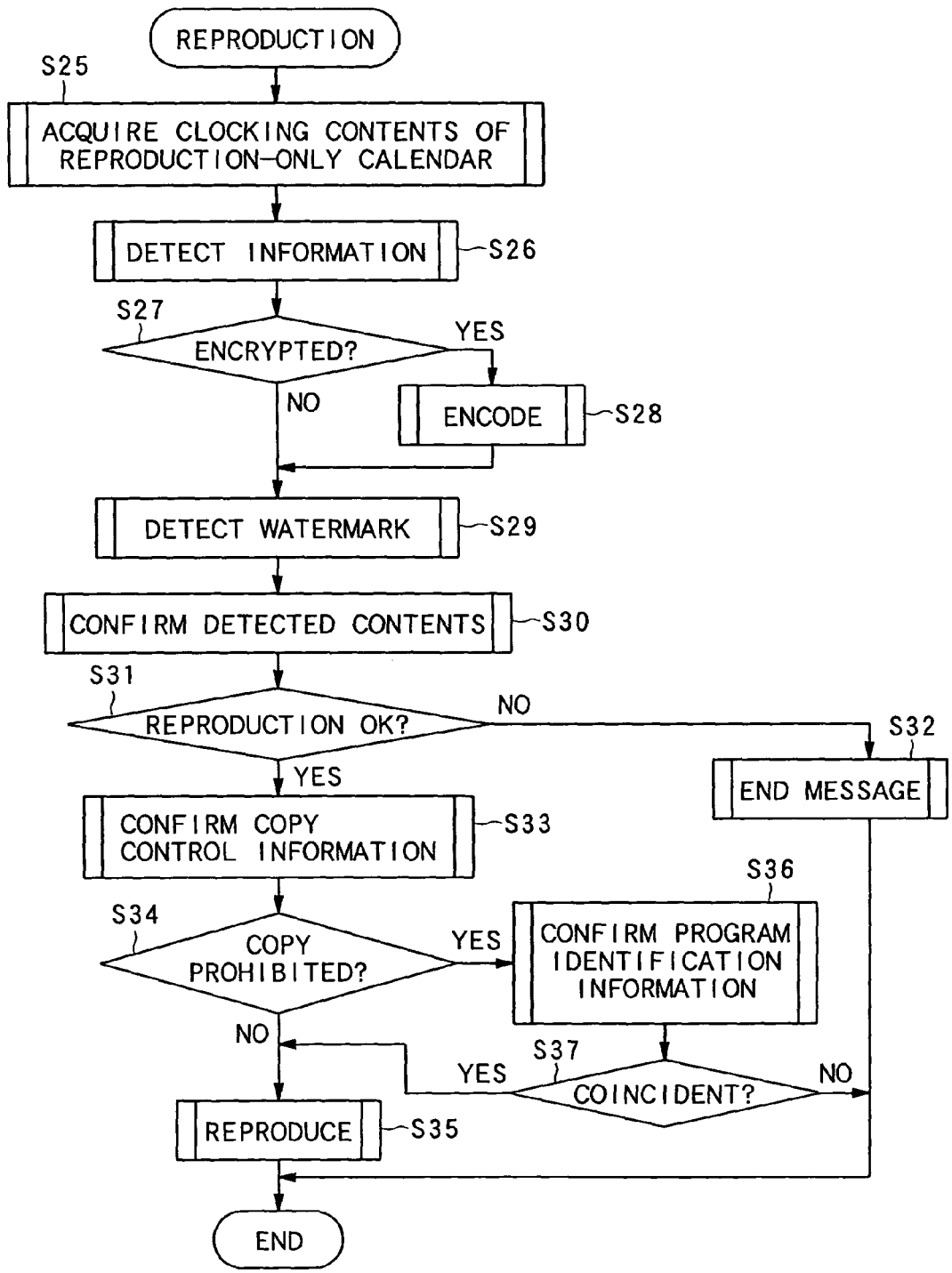
FIG. 9 is a flowchart showing the reproducing operation of the present embodiment.

FIG. 7 is a flowchart showing the introduction of the reproduction control program PG to the terminal T according to the present embodiment. FIG. 8 is a flowchart showing the transmission of the distribution information Ssv to the terminal T according to the present embodiment. FIG. 9 is a flowchart showing the reproduction of the distribution information Ssv in the terminal T according to the present embodiment. FIG. 10 is a flowchart showing processing for the reproduction-only calendar function in the terminal T according to the present embodiment.

First, referring to FIG. 7, the following will describe the introduction (installation) of the reproduction control program PG to the terminal T according to the present embodiment.

In the introduction, when information about a request of the introduction from the terminal T requires to install the reproduction control program PG is transmitted to the server SV, license information is transmitted as reply information from the server SV to the terminal T. The license information mainly concerns the handling of copyrights when the reproduction control program PG is installed to the terminal T and is used therein. The license information is displayed to the user on the display 22 in the terminal T (step S1).

Then, when the user does not accept license conditions corresponding to the provided licensing information (step S1; NO), the introduction shown in FIG. 7 is discontinued.

On the other hand, the provided license conditions are accepted by the user (step S1; YES), it is confirmed whether or not the terminal T about to install the reproduction control program PG has already installed another reproduction control program PG. Another reproduction control program PG includes program region information PRM indicating countries or regions other than countries or regions indicated by the program region information PRM provided in the reproduction control program PG about to be installed (that is, another reproduction control program PG that is permitted to function only in countries or regions other than countries or regions where the reproduction control program PG about to be installed is permitted to function) (step S23).

When it is decided in step S3 that another reproduction control program PG corresponding to the other countries or regions has been already installed (step S4; YES), in order to prevent the reproduction control program PG having the program region information PRM of different contents from being additionally installed into the terminal T, a warning is issued on the display 22 that introduction cannot be performed for the reproduction control program PG about to be installed (step S10), and the introduction of the reproduction control program PG is terminated according to the present embodiment.

On the other hand, when another reproduction control program PG corresponding to other countries or regions is not installed (step S4; NO), necessary modules are installed from the server SV as the reproduction control program PG corresponding to the countries or regions where the program should be installed (step S5). The reproduction-only calendar is started by the calendar module CL concurrently with the introduction and the calendar starts clocking (step S6).

Then, when the reproduction-only calendar is started, it is confirmed whether or not the reproduction-only calendar having started clocking is successfully synchronized with a registered calendar on the server SV which is a distribution source of the calendar and it is confirmed whether or not the other operations for introducing the reproduction control program PG are all completed and necessary modules required as the reproduction control program PG are all completed (step S7). When all the operations are completed (step S7; YES), the introduction of the present embodiment is terminated.

On the other hand, when it is decided in step S7 that all the necessary operations are not completed (step S7; NO), the modules of the reproduction control program PG at some midpoint of introduction are deleted in order to prevent the modules from being illicitly used (step S8), an error message indicating that the introduction ends in failure is displayed on the display 22 (step S9), and thus all the introducing operations are completed.

Referring to FIG. 8, the transmission (downloading) of the distribution information Ssv to the terminal T will be described below according to the present embodiment. The transmission is performed after the introduction of the reproduction control program PG.

In the transmission, identification information for identifying the user and the title of the distribution information Ssv to be transmitted (to be specific, the title of the movie included in the distribution information Ssv to be transmitted) are inputted in the terminal T requesting the transmission of the distribution information Ssv and are transmitted to the server SV (step S15). Then, the server SV is searched for the distribution information Ssv to be transmitted based on the inputted title and the search results are transmitted again to the terminal T and displayed on the display 22, so that it is confirmed whether or not the distribution information Ssv should be actually transmitted (step S16). Then, when transmission is not performed (step S16; NO), the transmission of FIG. 8 is terminated. When transmission is started based on the search results on the display 22 (step S16; YES), necessary distribution information Ssv itself is transmitted and is sequentially stored in the memory 26 of the terminal T as it is. Further, program identification information for identifying the installed reproduction control program PG is generated based on the identification information about the user that has been inputted in step S15 and the information about the title of the movie included in the distribution information Ssv, and the program identification information is stored in the CPU 25 of the terminal T (step S17). When the distribution information Ssv is transmitted and stored in step S17, even when the distribution information Ssv is encrypted before transmission, the information Ssv is stored as it is in the memory 26.

Subsequently, when the transmission of the distribution information Ssv is completed, the clocking time of the clocking reproduction-only calendar are corrected for synchronization with (coincidence with) the clocking time of the registered calendar in the server SV, which is the transmission source of the distribution information Ssv (step S18). Moreover, the clocking time of the system calendar having been provided in the terminal T itself (since before the reproduction control program PG is installed) are corrected for synchronization with the clocking time of the registered calendar (step S19).

Then, it is confirmed whether or not the calendars are synchronized with each other (step S20). When the synchronization is completed (step S20; YES), it is decided that the necessary distribution information Ssv has been transmitted, charging information including the charge of the distribution information Ssv (to be specific, a payee, a due date for payment, a method of payment, and so on) is transmitted to the server SV and is registered therein (step S24), and thus the transmission of the present embodiment is completed.

When the necessary operations are not completed (step S20; NO), the incompletion is displayed as an error message on the terminal T (step S21), and it is confirmed whether or not information about the retransmission of the distribution information Ssv is inputted to the terminal T (step S22).

In the case of retransmission (step S22; YES), a return is made to step S17 as it is and transmission is performed again. When retransmission is not performed (step S22; NO), the distribution information Ssv at some midpoint of introduction is deleted in order to prevent the distribution information Ssv from being illicitly used (step S23), and thus all the transmitting operations are completed.

Referring to FIG. 9, the following will describe the reproduction of the distribution information Ssv in the terminal T according to the present embodiment. The reproduction is performed after the reproduction control program PG is installed and the distribution information Ssv is transmitted.

In the reproduction, when the necessary distribution information Ssv is designated and an instruction to reproduce the information is provided, the clocking time are firstly acquired from the reproduction-only calendar which continues clocking (step S25). The distribution information Ssv to be reproduced is detected from the memory 26 (step S26).

Then, it is confirmed whether or not the detected distribution information Ssv is encrypted in a transmitted state from the server SV (step S27). When the information is encrypted (step S27; YES), the encryption is decoded by the descrambler 21 (step S28). When the information is not encrypted (step S27; NO), the information is detected as it is and the contents of the watermarks WM (FIG. 2) included in the distribution information Ssv are detected (step S29).

Subsequently, the contents of the information table TB are confirmed based on the detected contents of the watermarks WM (step S30).

Then, it is confirmed whether the distribution information Ssv is reproducible or not in the current terminal T based on the contents of information corresponding to countries or regions indicated by the program region information PRM, which is stored in the terminal T, particularly of the reproducible region information PA and the viewable period information PT in the information table TB (step S31). In step S31, to be specific, when reproduction is permitted based on the contents of the reproducible region information PA which corresponds to the countries or regions indicated by the program region information PRM stored in the terminal T and when the clocking time of the system calendar in the terminal T indicate a time within the viewable period of the viewable period information PT in the corresponding countries or regions, it is decided that the distribution information Ssv is reproducible in the terminal T.

Hence, when it is decided in step S31 that the contents of the distribution information Ssv are not reproducible (step S31; NO), an end message indicating the decision is displayed on the display 22 (step S32), and the reproduction of the present embodiment is terminated as it is.

On the other hand, when reproduction is permitted in step S31 (step S31; YES), regarding the copy control information CCI in the distribution information Ssv, confirmation is performed on the contents of the copy control information CCI corresponding to the countries or regions indicated by the program region information PRM stored in the terminal T (step S33).

Then, when copy is prohibited by the copy control information CCI (step S34; YES), the program identification information is read which has been recorded along with the distribution information Ssv in step S17 of FIG. 8 (hereinafter, the program identification information will be referred to as first program identification information), another program identification information is generated (hereinafter, the additionally generated program identification information will be referred to as second program identification information) by the same method as step S17 of FIG. 8 from the user identification information (step S15 of FIG. 8) and the information about the title of the movie that is included in the distribution information Ssv to be actually reproduced, and then, the first program identification information and the second program identification information are compared with each other (step S36).

Then, when the first and second program identification information are coincident with each other in the comparison of step S36 (step S36; YES), it is decided that the distribution information Ssv transmitted by the transmitting operation of FIG. 8 can be formally reproduced by the reproduction control program PG which is currently installed to the terminal T. The movie or the like included in the distribution information Ssv is reproduced by the installed reproduction control program PG as it is (step S35), and thus the reproduction of the present embodiment is completed.

On the other hand, when both of the information are not coincident with each other (step S36; NO), it is decided that the distribution information Ssv transmitted by the transmitting operation of FIG. 8 should not be reproduced by the reproduction control program PG currently installed to the terminal T, or it is decided that some kind of tampering is performed on the installed reproduction control program PG (to be specific, for example, the reproduction control program PG corresponding to the other countries or regions is illicitly installed). Then, the reproduction of the present embodiment is terminated.

Finally, referring to FIG. 10, handling for the reproduction-only calendar will be described according to the present embodiment.

Figure 10A:
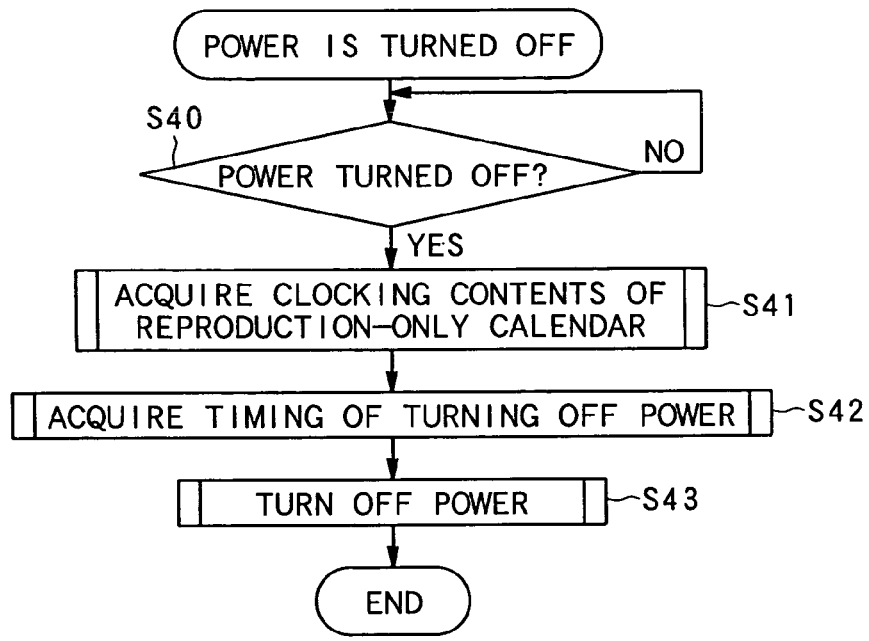
FIG. 10A is a flowchart showing the handling when the power of the terminal is turned off.

Referring to FIG. 10(A), the following will firstly describe the handling of the reproduction-only calendar when the power supply switch 24 of the terminal T is cut off. FIG. 10(A) is a flowchart showing the handling.

As shown in FIG. 10(A), when the power supply switch 24 of the terminal T is cut off, it is firstly confirmed whether or not an operation for cutting off the power supply switch 24 is performed in the operating part 23 (step S40). Then, when the operation for cutting off the power supply switch 24 is not performed (step S40; NO), the terminal enters a standby state. When the operation for cutting off the switch is performed (step S40; YES), the clocking time of the reproduction-only calendar are stored in the memory 26 at the time of cutting off the power supply switch 24 (step S41), and the cutting-off time is stored in the memory 26 based on the system calendar on the terminal T (step S42). Thereafter, an operation for cutting off the power supply to the terminal T is performed (step S43) and thus the handling is terminated.

Figure 10B:
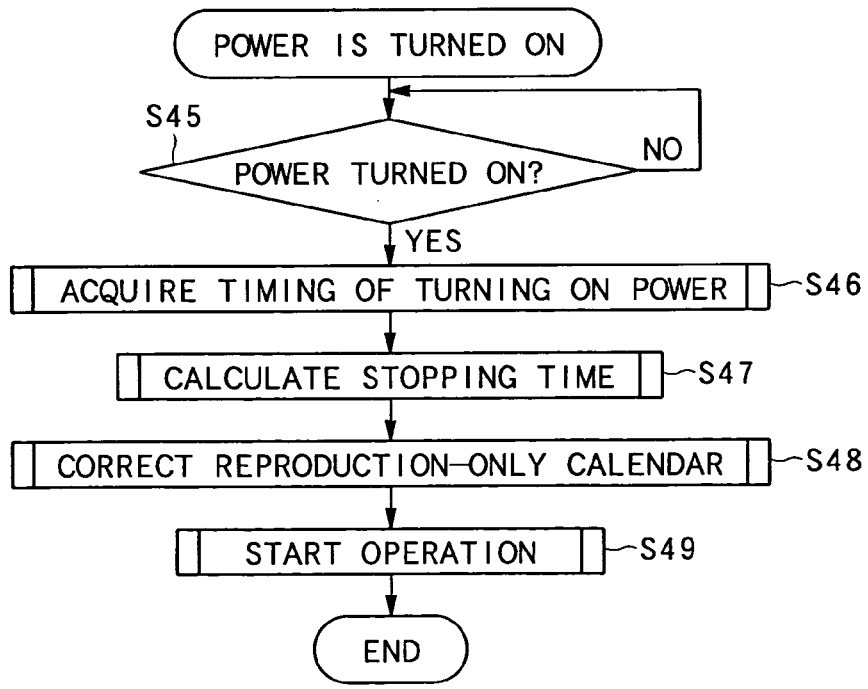

Referring to FIG. 10(B), the following will describe the handling of the reproduction-only calendar when the power supply switch 24 of the terminal T is turned on again. FIG. 10(B) is a flowchart showing the handling.

As shown in FIG. 10(B), when the power supply switch 24 of the terminal T is turned on again, it is firstly confirmed whether or not an operation for turning on the power supply switch 24 again is performed in the operating part 23 (step S45). When the operation of turning on the switch is not performed (step S45), the terminal enters a standby state. When the operation for turning on the switch is performed (step S45; YES), the time of turning on the switch is detected based on the system calendar (step S46). Then, the time of cutting off the power supply switch 24 that has been acquired and stored in the handling in step S42 of FIG. 10(A) is subtracted from the time detected in step S46, so that the time of turning off the power supply switch 24 is calculated (step S47). The calculated time is added to the clocking time having been acquired and stored in step S41 of FIG. 10(A), so that a displacement (delay) in the clocking time of the reproduction-only calendar is corrected (step S48), the displacement being caused by cutting off the power supply switch 24 of the terminal T. Thereafter, the transmission and reproduction described in FIGS. 8 and 9 are performed by using the reproduction-only calendar having the corrected clocking time (step S49).

As described above, according to the transmission and reproduction of the distribution information Ssv in the information transmission system S of the present embodiment, the acquired distribution information Ssv is reproduced only when a region indicated by the program region information PRM stored in the terminal T is coincident with a region indicated by the reproducible region information PA included as stream region information in the distribution information Ssv. Thus, the reproduction can be effectively prohibited in regions where the distribution information Ssv is not permitted to be reproduced.

Further, in the terminal T having installed the reproduction control program PG, another reproduction control program PG corresponding to a different region is prohibited from being installed. Thus, one terminal T functions only in one region and reproduction control can be effectively performed on the distribution information Ssv for each of the regions.

Moreover, since the common module GM including the program region information PRM is distributed to all the regions, reproduction control can be effectively performed on the distribution information Ssv for each of the regions receiving the reproduction control program PG.

Furthermore, since the copy of the distribution information Ssv is controlled based on the copy control information CCI, it is possible to effectively control illicit copy on the distribution information Ssv.

Further, the clocking of the reproduction-only calendar is started when the reproduction control program PG is installed, and the reproduction of the distribution information Ssv is permitted only when the clocking time indicate a time within the period indicated by the viewable period information PT, which is acquired along with the distribution information Ssv. Thus, the distribution information Ssv can be widely distributed in an efficient manner by controlling the reproduction of the distribution information Ssv based on a time base.

Further, the system calendar in the terminal T is changed to the clocking time of the reproduction-only calendar corresponding to the reproduction control program PG, thereby effectively performing reproduction control on the distribution information Ssv based on a time base controlled by the reproduction control program PG.

Moreover, the clocking time are corrected as follows: the time of cutting off the power supply switch 24 of the terminal T is detected and the detected time is added to the clocking time of the reproduction-only calendar at the time of cutting off the switch 24. Thus, even when the power supply switch 24 is turned off, reproduction control can be performed on the distribution information Ssv while accurately maintaining the clocking time corresponding to the reproduction control program PG.

The following arrangement is also applicable: programs corresponding to the flowcharts of FIGS. 7 to 10 are recorded in a recording medium such as a flexible disk and a hard disk or are stored after being acquired from the network such as the Internet, and the programs are read and executed by a microcomputer or the like, so that the microcomputer or the like can be caused to function as the CPU 25.

In this case, because of the function of the microcomputer or the like serving as the CPU 25 based on the programs, the acquired distribution information Ssv is reproduced only when a region indicated by the program region PRM stored in the terminal T is coincident with a region indicated by the reproducible region information PA included as stream region information in the distribution information Ssv. Thus, reproduction can be effectively prohibited in a region where the distribution information Ssv is not permitted to be reproduced.

Further, in the terminal T having installed the reproduction control program PG, another reproduction control program PG corresponding to a different region is prohibited from being installed. Thus, one terminal T functions only in one region and reproduction control can be effectively performed on the distribution information Ssv for each of the regions.

Besides, since the common module GM including the program region information PRM is distributed to all the regions, reproduction control can be effectively performed on the distribution information Ssv for each of the regions receiving the reproduction control program PG.

Furthermore, since the copy of the distribution information Ssv is controlled based on the copy control information CCI, it is possible to effectively control illicit copy on the distribution information Ssv.

Further, the clocking of the reproduction-only calendar is started when the reproduction control program PG is installed, and the reproduction of the distribution information Ssv is permitted only when the clocking time indicate a time within the period indicated by the viewable period information PT, which is acquired along with the distribution information Ssv. Thus, the distribution information Ssv can be widely distributed in an efficient manner by controlling the reproduction of the distribution information Ssv based on a time base.

Further, the system calendar in the terminal T is changed to the clocking time of the reproduction-only calendar corresponding to the reproduction control program PG, thereby effectively performing reproduction control on the distribution information Ssv based on the time base controlled by the reproduction control program PG.

Moreover, the clocking time are corrected as follows: the time of cutting off the power supply switch 24 of the terminal T is detected and the detected time is added to the clocking time of the reproduction-only calendar at the time of cutting off the switch 24. Thus, even when the power supply switch 24 is turned off, reproduction control can be performed on the distribution information Ssv while accurately maintaining the clocking time corresponding to the reproduction control program PG.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-256449 filed on Sep. 2, 2002 including the specification, claims, drawings and summary is incorporated herein by reference in its entirety.

What is claimed is:

1. A reproduction control computer program embodied in a computer-readable medium and representing a sequence of instructions, which when executed by that causes a reproducing computer, included in an information reproducing apparatus comprising nonvolatile time storing device, the instructions cause the reproducing computer, to function as: a storing device storing the first permitting region information; an acquiring device acquiring the first reproduction information including first permitting region information indicative of a region where reproduction of the acquired first reproduction information is permitted and first period information in advance, the first period information corresponding to the first region information and indicating a period during which the first reproduction information is permitted to be reproduced; a confirming device confirming whether or not a region indicated by the first permitting region information that is stored is the same as a region indicated by the first region information included in the first reproduction information that is acquired; a reproducing device reproducing the acquired first reproduction information only when the region indicated by the first permitting region information thus stored is the same as the region indicated by the permitting region information included in the acquired reproduction information; and a prohibiting device prohibiting another reproduction control computer program, which is used for reproducing at least second reproduction information including second permitting region information indicative of a region different from that indicated by the first permitting region information from being installed into the information reproducing apparatus which has the reproduction control computer program installed in it; an installed clocking device starting clocking when the reproduction control program is installed to the information reproducing apparatus; a change prohibiting device prohibiting a change in clocking time of the installed clocking device after the clocking is started; a time permitting device permitting the acquired first reproduction information to be reproduced by the reproducing device only when the clocking time indicate a time within a period indicated by the first period information; a changing device changing clocking time of existing clocking device to clocking time of the installed clocking device, the existing clocking device being provided in advance in the information reproducing apparatus and being able to continue clocking even when a power supply switch is turned off in the information reproducing apparatus; and an off detecting device detecting whether or not the power supply switch is turned off; a storage control device storing in the time storing device the clocking time of the existing clocking device when the power supply switch is turned off and storing the clocking time of the installed clocking device at that timing; an on detecting device detecting whether or not the power supply switch is turned on an off time detecting device detecting time information indicating a time period during which the power supply switch is turned off, based on the clocking time held by the existing clocking device when the turning on is detected and the clocking time of the existing clocking device, the contents being stored in the time storing device; and a clocking correcting device for, at the detection of the turning on, continuing clocking of the installed clocking device after adding time indicated by the time information to the clocking time of the installed clocking device at the detection of the turning off.

2. The reproduction control program according to claim 1, further comprising a partial reproduction control computer program causing the reproducing computer to function as the storing device, wherein the partial reproduction control computer program is distributed to all regions via a network.

3. The reproduction control computer program according to claim 1, wherein the first reproduction information includes first copy control information in advance, the first copy control information controlling copy performed on the first reproduction information after the information reproducing apparatus performs reproduction, and after the reproduction control computer program being installed to the information reproducing apparatus, the reproducing computer is caused to further function as a control device controlling the copy performed on the first reproduction information based on the first copy control information.

* * * * *